May 23, 1961 W. C. TWOMEY, JR 2,985,720

TRUNK CONCENTRATOR

Filed Sept. 20, 1957 2 Sheets-Sheet 1

INVENTOR
W.C. TWOMEY JR.
BY Donald M. Duft
ATTORNEY

May 23, 1961 W. C. TWOMEY, JR 2,985,720

TRUNK CONCENTRATOR

Filed Sept. 20, 1957 2 Sheets-Sheet 2

| TK REL | SEL | SEL |
|---|---|---|
| 1 | 0 | 2 |
| 2 | 1 | 2 |
| 3 | 0 | 3 |
| 4 | 1 | 3 |
| 5 | 0 | 4 |
| 6 | 1 | 4 |
| 7 | 0 | 5 |
| 8 | 1 | 5 |
| 9 | 0 | 6 |
| 10 | 1 | 6 |
| 11 | 0 | 7 |
| 12 | 1 | 7 |
| 13 | 0 | 8 |
| 14 | 1 | 8 |
| 15 | 0 | 9 |
| 16 | 1 | 9 |

INVENTOR
W.C. TWOMEY JR.
BY Donald M. Duft
ATTORNEY

United States Patent Office 2,985,720

Patented May 23, 1961

2,985,720

TRUNK CONCENTRATOR

William C. Twomey, Jr., West Covina, Calif., assignor to American Telephone and Telegraph Company, a corporation of New York Filed Sept. 20, 1957, Ser. No. 685,327

4 Claims. (Cl. 179—18)

Figure 1:
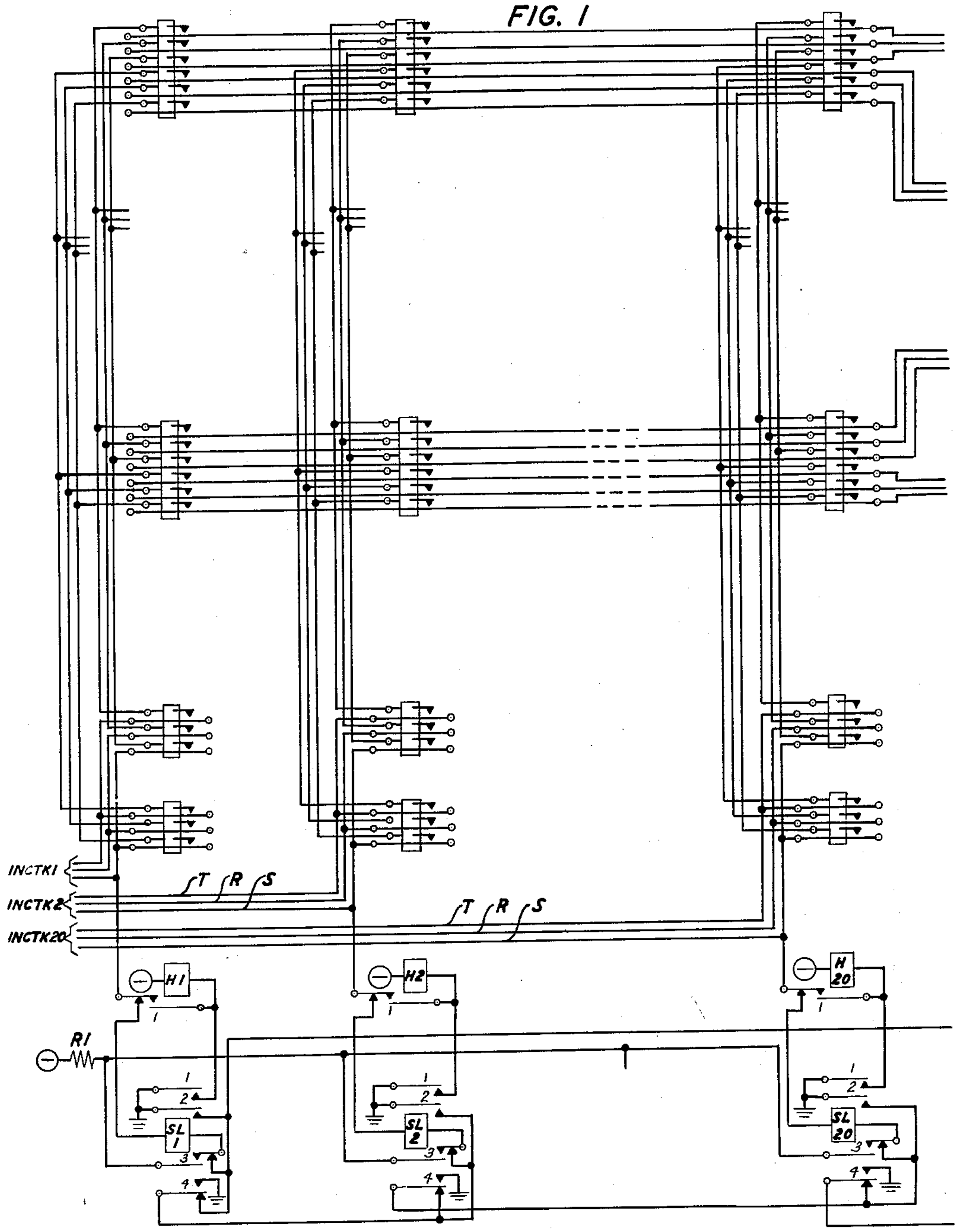

This invention pertains to a switching system and more particularly, to a switching system for interconnecting a plurality of incoming circuits with a lesser number of outgoing circuits.

Ever since the advent of automatic switching systems, inventors in the telephony field have sought to provide improved means for interconnecting one or more of a plurality of incoming circuits with one or more of a plurality of outgoing circuits. Systems for performing this basic function range in size and complexity from a large central office for interconnecting many thousands of circuits down to a single stepping switch for interconnecting only two circuits at a time.

While these systems are satisfactory for the purposes for which they were designed, there is still need for an improved system for interconnecting a moderate number, such as ten or twenty, of incoming circuits with an equal or lesser number of outgoing circuits. Large, crossbar central office circuits are not suitable for this purpose because of the relatively high cost of the common control equipment. Step-by-step switching circuits are also not entirely suitable because of the size of the necessary equipment and the relatively high maintenance cost associated therewith.

It is an object of the invention to provide improved means for interconnecting a moderate number of incoming circuits with an equal or lesser number of outgoing circuits.

It is a further object of the invention to provide improved concentrating arrangements, whereby a plurality of incoming circuits can be interconnected to a lesser number of outgoing circuits leading to the same destination.

The present invention provides an efficient and economical means whereby a single crossbar switch, together with a small number of control relays, can be used as a line or trunk concentrator to interconnect a plurality of incoming circuits to a lesser number of outgoing circuits. The present invention has the advantage of having relatively few moving parts and thereby requires a minimum of maintenance. This adapts it for use in remote, unattended switching centers.

In the present invention, each incoming circuit is connected to the vertical contacts of an individual column of a crossbar switch. In addition, each incoming circuit is connectable to, and associated with the hold magnet for its vertical column. Each outgoing circuit is connectable with the contacts in two horizontal levels of the switch.

A preselection circuit is associated with the select magnets of the switch whereby the particular outgoing circuit that is to serve the next incoming call is preselected and the select magnets of its two associated levels held operated by the preselection circuit. Then, upon the subsequent reception of a call over an incoming circuit, the hold magnet associated with the incoming circuit is operated, thereby closing the crosspoint contacts unique to the calling incoming circuit and the preselected outgoing circuit. The preselection circuit reoperates in response to this interconnection, releases the previously operated select magnets, and operates the select magnets associated with the outgoing circuit that is to serve the next incoming call.

The preselection circuit comprises, in part, a chain of relays, each of which is associated with an individual one of the outgoing circuits. The winding of each relay in the chain is connected to the sleeve of its outgoing circuit whereby each relay will be operated whenever its related outgoing circuit or trunk is busy by virtue of the ground placed thereon by the sleeve of the incoming trunk with which it is interconnected. Accordingly, at any given instant of time, all the relays in the chain will be operated which are associated with outgoing trunks currently serving incoming calls.

The contacts of each relay in the chain are connected to the windings of an individual pair of select magnets. The contacts of these relays are also arranged in a chain circuit whereby, whenever an outgoing trunk preselection is made, a ground is applied to the chain so that the first unoperated relay therein applies this ground to its pair of select magnets, thereby operating them. If the first relay in the chain is operated, indicating that its trunk is now busy, the preselection circuit ground will be applied to the next relay in the chain which either will operate its related pair of select magnets, if normal, or will send the ground on to the next relay in the chain, if busy.

This chain of relays constitutes a preference circuit whereby the select magnets associated with the first relay in the chain will be operated during each preselection provided its outgoing trunk is idle. If this trunk is busy at the time, the select magnets associated with the first unoperated relay in the chain are operated. Means is also provided for alternately applying the preselection ground to the two opposite ends of the chain on every other call in order to provide a better distribution of calls to the outgoing trunks and in order to equalize wear on the equipment.

The present circuit could be ideally used as a trunk or line concentrator at some point in a large switching system whereby it is desired to provide a plurality of incoming circuits with service to a distant point over a lesser number of outgoing circuits for reasons of economy. This is a common expedient in telephone switching systems and is used in order to save cable costs when there is no necessity of interconnecting a first and a second point with as many transmission paths as there are incoming to the first point.

A feature of the invention is the provision of a circuit comprising a single crossbar switch and a relatively small number of control relays for interconnecting a plurality of incoming lines with a plurality of outgoing lines.

A further feature of the invention is the provision of a single crossbar switch utilized as an interconnection arrangement wherein a preselection is made of the outgoing circuit that is to serve the next incoming call.

A further feature of the invention is a single crossbar switch arranged as a circuit concentrator whereby the outgoing circuit that is to serve the next call is preselected by the operation of the select magnet associated therewith.

A further feature of the invention is a single crossbar switch arranged as a circuit concentrator in combination with a preselection circuit comprising a chain of relays, each of which is individually associated with a particular outgoing circuit and, each of which is operated at the time its associate outgoing circuit serves a call.

Figures 2, 3:
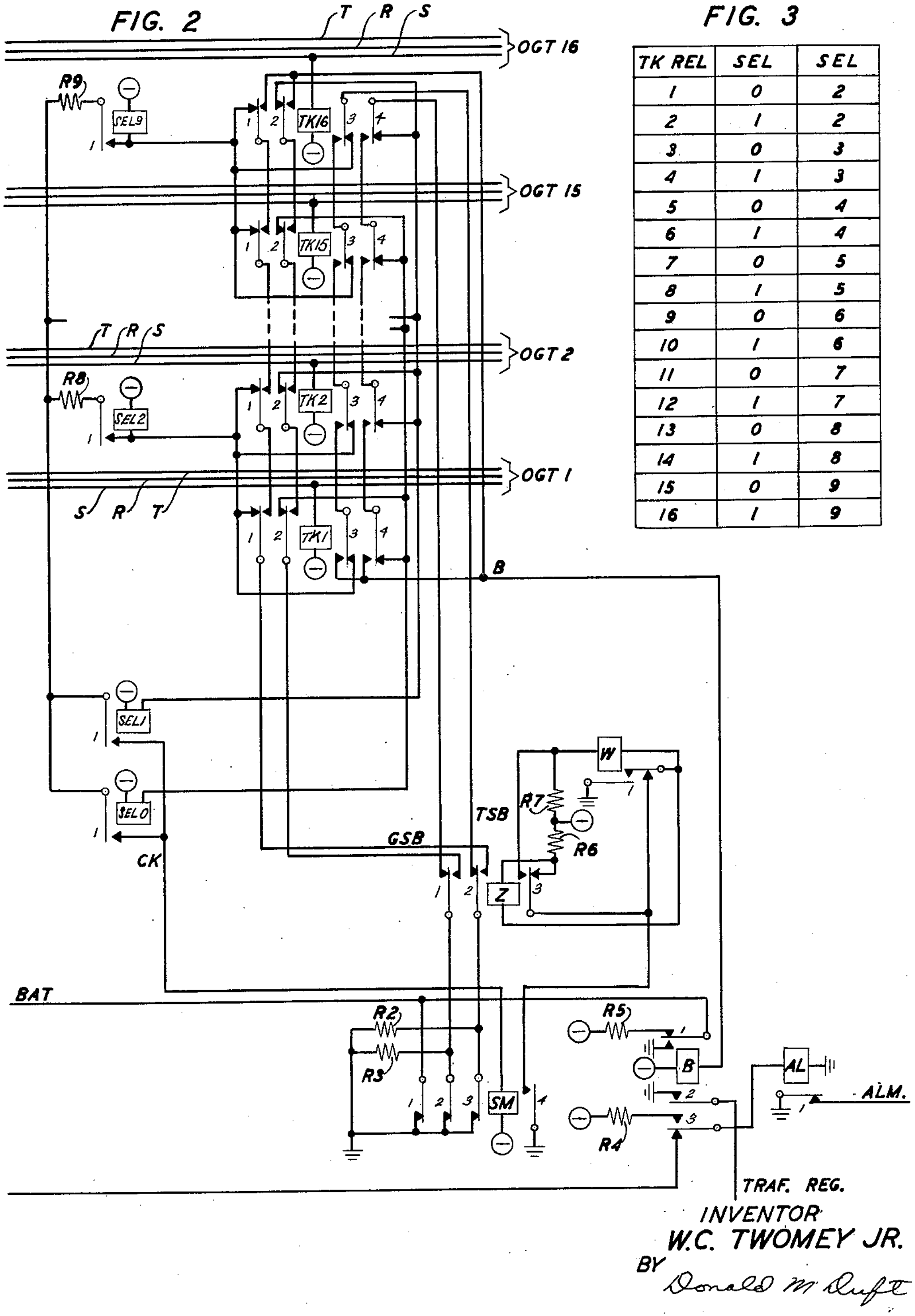

The foregoing and other objects and features of the invention, the novel features of which are specifically set forth in the claims appended hereto, may be more readily understood from the following description when read with reference to the attached drawings in which Figs. 1 and 2, when placed side by side, show the detailed circuits of the present invention and in which Fig. 3 shows how certain of the relays of Fig. 2 are interconnected with the select magnets.

The crossbar switch shown on the drawings has ten horizontal levels and twenty vertical columns. A select magnet, abbreviated SEL, is shown associated with each level while a hold magnet, abbreviated H, is associated with each vertical column. A group of contacts, commonly referred to as crosspoints, is shown at the intersections of each column and row. The closure of a particular set of crosspoint contacts is effected by first operating the select magnet associated with the contacts and then by operating and holding operated the hold magnet associated with the contacts. The select magnet may be released and the closed crosspoint contacts will remain closed once the hold magnet has operated. Crossbar switches are well known in the telephony art and therefore, no further discussion concerning the nature of their operation is believed necessary.

In the following discussion the contacts within a single vertical column will be referred to as the vertical contacts, while the contacts within a single horizontal level of the switch will be referred to as the horizontal contacts. This characterization is commonly used in the telephone art when discussing crossbar switches.

The incoming trunk circuits are shown on the lower left-hand portion of Fig. 1. Each trunk is connected to the contacts of an individual column. In addition, each trunk circuit is individually connected to a single relay in a series of relays designated SL1–SL2–SL20. Associated with each SL– relay is the hold magnet for a particular column of the switch.

The outgoing trunk circuits, which are shown to be sixteen in number, extended from the right-hand side of levels 2 through 9 of the switch. The present drawings show an arrangement whereby a crossbar switch having ten levels can serve sixteen outgoing trunk circuits. This expedient is old in the art and is accomplished by associating each outgoing circuit with one of the horizontal levels 2 through 9 as well as with one of the levels 0 and 1. In this manner a path is closed to a particular outgoing circuit by operating the select magnet for either level 0 or 1 and then by operating the select magnet associated with the other set of horizontal contacts to which the outgoing circuit is connected. For example, if it is desired to interconnect incoming trunk 20 to outgoing trunk 2, select magnets 1 and 2 are operated. On the other hand, if it is desired to interconnect incoming trunk 20 with outgoing trunk 1 select magnets 0 and 2 are operated before hold magnet 20 is operated.

The ten select magnets 0 through 9 are associated with a group of relays designated TK1, TK2–TK15 and TK16. Of this group, only relays TK1, TK2, TK15 and TK16 are shown in detail while the rest of the series is shown diagrammatically. These relays, together with relays SM, W and Z, provide a means for operating and holding operated a pair of select magnets to preselect the outgoing trunk that is to serve the next call on an incoming trunk circuit. Upon the interconnection of the incoming trunk with the preselected outgoing trunk, the select magnets associated with the preselected outgoing trunk release and the TK relays provide a path to operate the select magnets associated with the outgoing trunk that is to serve the next incoming call.

The path over which the select magnets associated with the preselected outgoing trunk are operated begins with ground on contacts 2 and 3 of relay SM which is normal whenever a preselection is to be made. This ground is extended through either contacts 1 and 2 make, or contacts 1 and 2 break of relay Z. Relays W and Z constitute what is commonly known in the art as a "WZ" relay combination. This circuit operates as a count of two divider to operate and release relay Z once for every two input pulses to the circuit as supplied by a ground on contacts 4 of relay SM operated.

This circuit works in the following manner: assuming both relays to be normal, the first ground from contacts 4 of relay SM is extended through break contacts 1 of relay W, through the winding of relay W, through resistor R7 to negative battery. The closure of this path operates relay W. Relay Z does not operate at this time because ground from the same contacts of relay SM is also extended through break contacts 3 of relay Z thereby shortcircuiting its winding. This shortcircuit is removed as soon as make contacts 4 of relay SM release and relay Z operates at this time to the ground on make contacts 1 of relay W. The next time ground is applied by contacts 4 of relay SM, relay W is shortcircuited and releases by virtue of the ground extended through make contacts 3 of relay Z. Relay Z remains operated as long as relay SM remains operated. Relay Z releases upon the next release of relay SM, thereby restoring this "WZ" relay combination to normal.

Each of relays TK1 through TK16 is connected to the sleeve of an outgoing trunk circuit. At any given time, each TK– relay assoicated with a busy outgoing trunk will be operated from the ground applied thereto by the sleeve of the incoming trunk interconnected therewith.

Let it be assumed at the time an outgoing trunk preselection is to be made that all outgoing trunks are idle and that relay Z is normal. In this case the ground on contacts 2 and 3 of relay SM normal will be extended through contacts 1 and 2 break of relay Z to contacts 3 and 4 break of relay TK16 normal. The ground on contacts 3 break of relay TK16 is extended to the winding of select magnet 9 to operate it. The ground on contacts 4 break of relay TK16 normal is extended to the winding of select magnet 1 to operate it. The ground on the winding of select magnet 9 is extended through its make contacts 1, through resistor R9, through contacts 1 of select magnet 1 operated, to the winding of relay SM to operate it. The operation of its contacts 2 and 3 removes the direct ground from the windings of the select magnets and allows resistors R2 and R3 to supply a resistance holding ground to these magnets so that they will not overheat during the time they are held operated.

The opening of contacts 1 of relay SM removes the ground supplied to the sleeves of all idle incoming trunks. This ground makes the concentrator busy during the interval of time required for the outgoing trunk preselection circuits to operate as manifested by the release of relay SM. This ground is supplied through the break contacts 3 of relay SL1, through the winding of relay SL1, through break contacts 1 of hold magnet 1, to the sleeve of incoming trunk 1. The same ground is also extended through a chain circuit comprising break contacts 4 on each of relays SL1 through SL16 and, from there, in a similar fashion to the sleeves of the other idle incoming trunks. The closure of contacts 4 of relay SM applies ground to the input of the "WZ" relay circuit which proceeds with its counting action so that upon the next release of relay SM, relay Z will operate and shift the outgoing trunk preselection preference circuit in the manner described hereinafter.

Select magnets 1 and 9 have now operated and, thereby, have partially closed a path to preselect outgoing trunk 16 to serve the next incoming call. Let it be assumed that the next call arrives on incoming trunk 20. The arrival of this call is manifested by a ground on the sleeve of incoming trunk 20. This ground is extended through the break contacts of hold magnet 20, through the winding of relay SL20, through break contacts 3 of relay SL20, through a chain circuit comprising break contacts 4 on relays SL19 through SL1, through the break contacts 1 of relay B, through resistor R5 to a negative battery potential. This circuit causes relay SL20 to operate.

The closure of make contacts 4 of relay SL20 applies a ground through break contacts 3 of relay B to the winding of slow release relay AL, which operates and actuates an alarm in the event that relay SL20 remains operated beyond a certain predetermined time. The closure of make contacts 3 of relay SL20 provides a negative battery potential through resistor R1 to hold relay S1 operated when its break contacts 3 open. The closure of make contacts 2 of relay SL20 extends a ground through break contacts 4 of all the preceding SL– relays in the chain, thereby placing a ground on the incoming sleeves of all idle incoming trunks through the windings of their associated SL– relays. The closure of make contacts 1 relay SL20 extends a ground to operate hold magnet H20. The closure of make contacts 1 of hold magnet H20 supplies a ground from its incoming sleeve to its winding to hold it operated. The opening of the break contacts on hold magnet H20 breaks the path holding relay SL20 operated, thereby causing it to release.

The interconnection of incoming trunk 20 with outgoing trunk 16 on the operation of the crosspoint contacts unique to hold magnet 20 and select magnets 1 and 9 extends the ground on the incoming sleeve to the sleeve of outgoing trunk 16. This ground operates relay TK16, which remains operated for the duration of this call. Operation of relay TK16 opens its break contacts 3 and 4 which removes the ground holding select magnets 9 and 1 operated, thereby causing them to release. The release of these select magnets upon the operation of relay TK16 breaks the path holding relay SM operated, thereby causing it to release.

The release of relay SM removes the ground supplied to the "WZ" relay combination from make contacts 4, thereby causing relay Z to operate. A ground is now supplied through break contacts 2 and 3 of relay SM, through contacts 1 and 2 make of relay Z, to break contacts 1 and 2 of relay TK1. Assuming that all outgoing trunks other than 16 are idle, all of relays TK1 through TK15 will be released at this time. Therefore, the ground now supplied to contacts 1 and 2 break of relay TK1 is extended to the windings of select magnets 2 and 0, respectively, to operate them, thereby preselecting outgoing trunk 1 to serve the next incoming call. The operation of select magnets 2 and 0 cause relay SM to operate in a manner similar to that already described.

On the other hand, let it be assumed that outgoing trunk 15 is the only idle one after incoming trunk 20 is interconnected with outgoing trunk 16. In this case, the ground on contacts 2 and 3 break of relay SM is extended through contacts 1 and 2 make of relay Z, through make contacts 1 and 2 on all of relays TK1 through TK14, which are operated at this time by virtue of outgoing trunks 1 through 14 being busy, to break contacts 1 and 2 of relay TK15, which is the only relay in the chain that is normal, since outgoing trunk 15 has been assumed to be the only idle trunk in the group. The ground on contacts 1 and 2 break of relay TK15 is extended to the windings of select magnets 9 and 0, respectively, thereby operating them to preselect outgoing trunk 15 for the next incoming call. The operation of select magnets 9 and 0 closes a path to operate relay SM in a manner similar to that previously described.

The next call on an incoming trunk will cause the associated relay in the series of relays SL1 through SL20 to operate, thereby operating its associated hold magnet and interconnecting the incoming calling trunk to outgoing trunk 15 in a manner similar to that already described.

The chart of Fig. 3 shows how the ten select magnets are connected to the contacts of relays TK1 through TK16. In accordance with the chart, the contacts of relay TK1 are connected to the windings of select magnets 0 and 2. Similarly, the contacts of relay TK2 are connected with the windings of select magnets 1 and 2. Also the contacts of relays TK15 and TK16 are connected to the windings of the select magnets shown in the second, and third columns of the chart of Fig. 3. Functionally, this chart indicates what pair of select magnets will be operated at the time the ground from contacts 2 and 3 of relay SM arrive at the contacts of a particular unoperated TK– relay. Thus, if the ground potential from relay SM arrives at the contacts of relay TK1 normal, it will be extended to the windings of select magnets 0 and 2 to operate them regardless of whether relay Z is operated or normal.

Relay B operates when all outgoing trunks are busy as manifested between the operation of all of relays TK1 through TK16. The path to operate relay B may comprise make contacts 3 on each TK– relay, contacts 2 break of relay Z and ground on contacts 3 break of relay SM. Alternatively, the path to operate relay B may comprise contacts 1 make of each TK– relay operated, contacts 2 make on relay Z and ground on contacts 3 of relay SM. Relay B operated supplies ground through make contacts 1 to the sleeves of all idle incoming trunks in a manner similar to that already described in connection with contacts 1 break of relay SM. Contacts 2 make of relay B operated may extend a ground to operate a register to indicate how many times all available outgoing trunks were busy. Contacts 3 make on relay B close a battery through resistance R4 to operate relay AL and thereby actuate an alarm if the all trunks busy situation should exist beyond a certain length of time.

The specific embodiment of the invention described herein has assumed the existence of twenty incoming trunks and sixteen outgoing trunks. This showing is to be considered as exemplary rather than limiting. For example, an additional crossbar switch could be interconnected with the one already shown to provide service for forty incoming trunks and sixteen or fewer, if desired, outgoing trunks. This could easily be accomplished by paralleling the horizontal contacts on the additional crossbar switch with those on the switch shown herein. The vertical contacts on the additional switch would then be interconnected to the additional twenty incoming trunks in a manner similar to that shown herein for the first twenty incoming trunks. In this case, the chain of relays SL1 through SL20 would, of course, be expanded so as to comprise a new chain of relays entitled SL1 through SL40.

Therefore, although the invention has been described in its relation to a certain specific embodiment, the invention should not be deemed limited to these embodiments since numerous other embodiments and modifications will readily occur to one skilled in the art without departing from either the spirit or scope of the invention.

What is claimed is:

1. In a switching system, a crossbar switch, horizontal and vertical contacts on said switch, select magnets associated with said horizontal contact and hold magnets associated with said vertical contacts, a plurality of incoming call circuits connected to said vertical contacts, a plurality of outgoing trunk circuits connected to said horizontal contacts, an outgoing trunk preselection circuit for operating the select magnets associated with the outgoing trunk that is to serve the next incoming call, means including one of said hold magnets responsive to a call on one of said incoming call circuits to interconnect said one call circuit with the outgoing trunk whose select magnets are currently operated, means responsive to said interconnection to release said operated select magnets, and further means responsive to said interconnection whereby said preselection circuit operates the select magnets of the outgoing trunk that is to serve the next incoming call.

2. A concentrator for interconnecting any one of a plurality of incoming circuits with any one of a plurality of outgoing circuits comprising, a crossbar switch having select magnets associated with its horizontal contacts and hold magnets associated with its vertical contacts, a plurality of incoming call circuits connected to said vertical contacts, a plurality of outgoing trunk circuits connected to said horizontal contacts, an outgoing trunk preselection circuit for operating the select magnets associated with the outgoing trunk that is to serve the next incoming call, means responsive to a call on one of said incoming call circuits to interconnect said one-call circuit with the outgoing trunk whose select magnets are currently operated, means responsive to said interconnection to release said operated select magnets, and further means responsive to said interconnection whereby said preselection circuit operates the select magnets of the outgoing trunk that is to serve the next incoming call.

3. A concentrator for interconnecting any one of a plurality of incoming trunks with any one of a plurality of outgoing trunks comprising, a crossbar switch having select magnets associated with its horizontal contacts and hold magnets associated with its vertical contacts, a first series of relays each of which is individually associated with one of said hold magnets, a plurality of incoming trunks connected to said vertical contacts, a plurality of outgoing trunks connected to said horizontal contacts, a second series of relays each of which is individually associated with one of said outgoing trunks, an outgoing trunk preselection circuit comprising said second series of relays for operating the select magnets associated with the outgoing trunk that is to serve the next incoming call, means including a relay in said first series of relays responsive to a call on one of said incoming trunks to interconnect said one trunk with the outgoing trunk whose select magnets are currently operated, means including a relay in said second series of relays responsive to said interconnection to release said operated select magnets, and further means including a relay in said second series of relays responsive to said interconnection whereby said preselection circuit operates the select magnets of the outgoing trunk that is to serve the next incoming call.

4. A concentrator for interconnecting any one of a plurality of incoming trunks with any one of a plurality of outgoing trunks comprising, a crossbar switch having select magnets associated with its horizontal contacts and hold magnets associated with its vertical contacts, a first series of relays each of which is individually associated with one of said hold magnets, a plurality of incoming trunks connected to said vertical contacts, a plurality of outgoing trunks connected to said horizontal contacts, a chain of relays comprising an outgoing trunk preselection circuit with each relay in said chain being individually associated with one of said outgoing trunks, means whereby each relay in said chain is operated whenever its associated trunk is busy, interconnections between the contacts of each relay in said chain and an individual pair of said select magnets, a preference circuit comprising interconnections between the contacts of each relay in said chain whereby a circuit is partially closed to the select magnets associated with a preferred outgoing trunk, the one outgoing trunk that is preferred at any given instant of time being determined by the particular combination of relays then operated in said chain, a control relay operative to close said circuit to the select magnets associated with said preferred outgoing trunk thereby operating them, means including a relay in said first series of relays responsive to a call on one of said incoming trunks to interconnect said one trunk with the outgoing trunk whose select magnets are currently operated, means including a relay in said chain of relays responsive to said interconnection to release said operated select magnets, and further means including said preference circuit and said control relay responsive to said interconnection whereby a circuit is closed to operate the select magnets of the outgoing trunk that is to serve the next incoming call.

References Cited in the file of this patent

UNITED STATES PATENTS

| | | |
|---|---|---|
| 1,376,371 | Yanochowski | Apr. 26, 1921 |
| 1,567,040 | Clark | Apr. 29, 1925 |
| 1,586,518 | Clark | June 1, 1926 |
| 1,761,115 | Gardner | June 3, 1930 |
| 2,363,955 | Gillings et al. | Nov. 28, 1944 |
| 2,532,097 | Hersey | Nov. 28, 1950 |
| 2,609,456 | Hall | Sept. 2, 1952 |
| 2,711,444 | Oberman | June 21, 1955 |
| 2,813,929 | Oberman | Nov. 29, 1957 |